(12) United States Patent
Garg et al.

(10) Patent No.: US 11,661,076 B1
(45) Date of Patent: May 30, 2023

(54) TECHNIQUES FOR DETERMINING A DISTANCE BETWEEN A POINT AND A SPIRAL LINE SEGMENT

(71) Applicant: Zoox, Inc., Foster City, CA (US)

(72) Inventors: Lakshay Garg, Redwood, CA (US); Joona Markus Petteri Kiiski, Cupertino, CA (US)

(73) Assignee: Zoox, Inc., Foster City, CA (US)

( * ) Notice: Subject to any disclaimer, the term of this patent is extended or adjusted under 35 U.S.C. 154(b) by 164 days.

(21) Appl. No.: 17/089,443

(22) Filed: Nov. 4, 2020

(51) Int. Cl.
*B60W 60/00* (2020.01)
*B60W 40/06* (2013.01)
*G06F 18/22* (2023.01)
*G06V 20/56* (2022.01)

(52) U.S. Cl.
CPC .......... *B60W 60/001* (2020.02); *B60W 40/06* (2013.01); *G06F 18/22* (2023.01); *G06V 20/588* (2022.01); *B60W 2552/53* (2020.02); *B60W 2554/80* (2020.02)

(58) Field of Classification Search
None
See application file for complete search history.

(56) References Cited

U.S. PATENT DOCUMENTS

| | | | |
|---|---|---|---|
| 10,671,075 B1 | 6/2020 | Kobilarov | |
| 10,831,210 B1 | 11/2020 | Kobilarov | |
| 2012/0101725 A1* | 4/2012 | Kondekar | A01B 79/005 701/445 |
| 2018/0150081 A1* | 5/2018 | Gross et al. | G05D 1/0217 |
| 2018/0307245 A1* | 10/2018 | Khawaja et al. | B60W 30/00 |
| 2020/0142417 A1 | 5/2020 | Hudecek | |
| 2020/0189590 A1* | 6/2020 | Luo | B60W 60/0011 |

OTHER PUBLICATIONS

Huang, et al., U.S. Appl. No. 16/517,506, titled "Unstructured Vehicle Path Planner", filed on Jul. 19, 2019, 82 pages.

* cited by examiner

*Primary Examiner* — David P. Merlino
(74) *Attorney, Agent, or Firm* — Lee & Hayes, P.C.

(57) ABSTRACT

Techniques and methods for determining a distance between a point within an environment and a reference line are discussed herein. For instance, a vehicle may be navigating. While navigating, the vehicle may receive a reference line that represents a road segment and determine various regions relative to the reference line. Additionally, the vehicle may generate sensor data representing the environment and identify an object using the sensor data. The vehicle may then determine that a location of the object corresponds to a region from the regions. Based on the region, the vehicle may determine a rule for identifying the distance between the vehicle and the reference line. The vehicle may then determine the distance using the rule, the location of the object, and the reference line. Additionally, the vehicle may determine an action for the vehicle to perform that is based on the distance.

20 Claims, 8 Drawing Sheets

TECHNIQUES FOR DETERMINING A DISTANCE BETWEEN A POINT AND A SPIRAL LINE SEGMENT

BACKGROUND

When navigating around an environment, it is important for an autonomous vehicle to determine a distance between a location of an object within the environment and a location along a road segment where the autonomous vehicle is navigating. For instance, the autonomous vehicle may use the distance to determine one or more actions for the autonomous vehicle to perform, such as to continue navigating along a trajectory of the autonomous vehicle or yield to the object. However, determining such a distance may be difficult in some circumstances. For example, such as when the autonomous vehicle is navigating along a road segment that includes one or more curves, it may be difficult for the autonomous vehicle to determine the closest distance between the location of the object and the road segment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
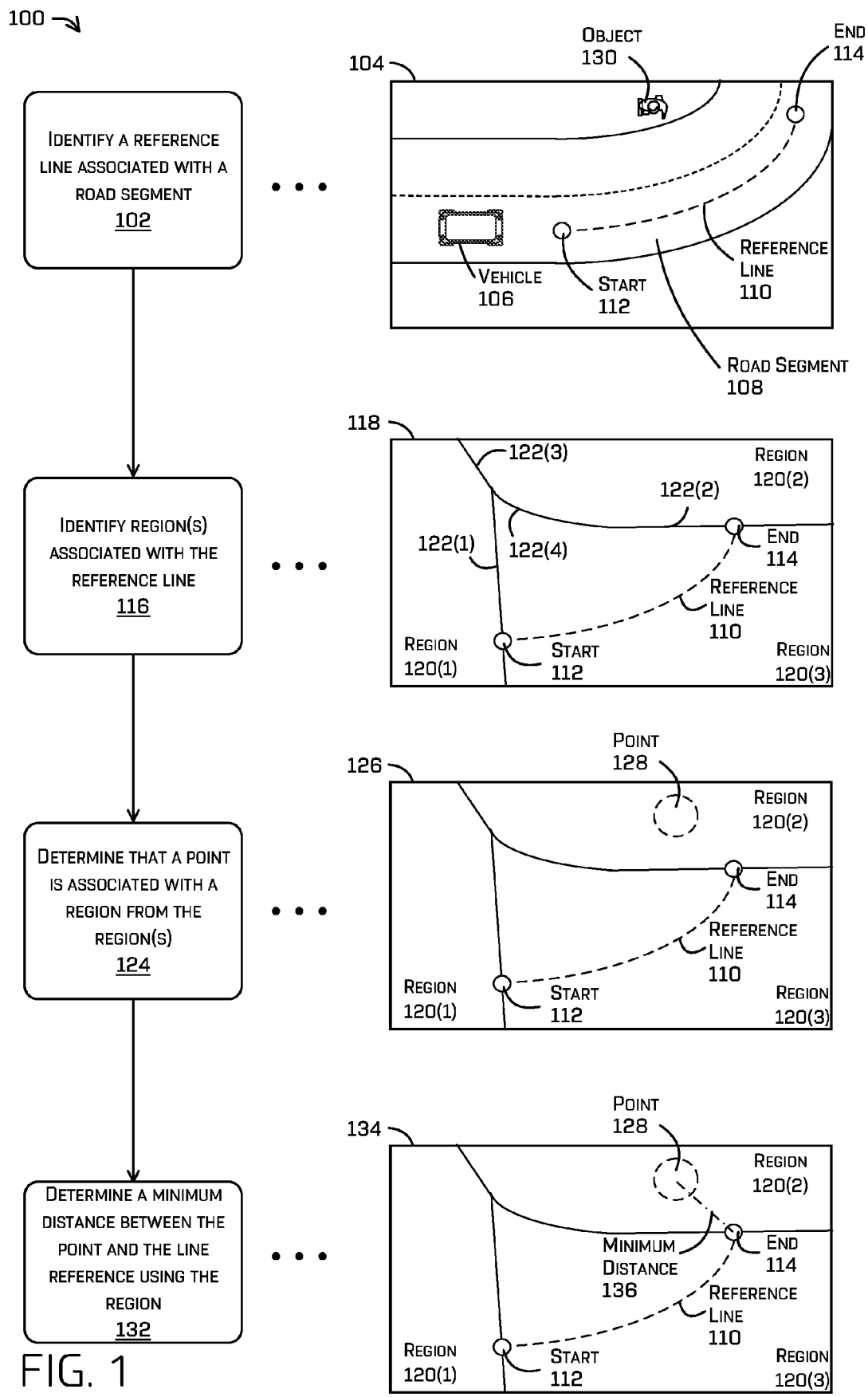
FIG. 1 is a pictorial flow diagram of an example process for determining a distance between a point within an environment and a reference line, in accordance with embodiments of the disclosure.

Determining a distance between a point in an environment and a reference line segment is fundamental and critical to operation of an autonomous vehicle in an environment. For instance, the autonomous vehicle may use the distance to determine one or more actions for the autonomous vehicle to perform, such as to continue navigating along a trajectory of the autonomous vehicle or yield to the object. However, determining such a distance may be difficult in some circumstances. For example, such as when the autonomous vehicle is navigating along a road segment that includes one or more curves, it may be difficult for the autonomous vehicle to determine the closest distance between the location of the object and a point along the road segment. As an example, control of the autonomous vehicle may be with respect to a route-relative reference frame whereas the object detected is within a Cartesian reference frame.

As such, this disclosure is directed to techniques for determining distances between points within an environment and a reference line. More specifically, the computing device(s) (e.g., computing device(s) of an autonomous vehicle) may determine or receive a reference line that represents a road segment for which the autonomous vehicle is navigating. In some examples, such as when the road segment includes one or more curves, the computing device(s) may represent the road segment as at least a portion of spiral reference line (e.g., a clothoid section). The autonomous vehicle may then determine regions that are associated with the reference line and use the regions when determining distances between various points, such as locations of objects, and points along the reference line. For example, the computing device(s) may associate each region with at least one rule and/or equation for determining minimum distances between points within the region and the reference line. As such, and for a point within the environment, the computing device(s) may then determine which region the point is located within and use the rule and/or equation associated with the region to determine the minimum distance between the point and the reference line.

For more detail, the computing device(s) may initially identify a reference line that represents a road segment. In some instances, the computing device(s) generate the reference line using at least line segments, circular arcs, and spirals. For example, the reference line may include one or more lines segments that include one or more lines, one or more circular arcs, and/or one or more spirals. Each line segment may include a first endpoint, such as a starting point, and a second endpoint, such as an ending point. In some instances, a spiral may correspond to a clothoid section that has been translated, scaled, and/or rotated. In some instances, the clothoid section may be determined using the following equation:

$$z(s) = \int_{x=0}^{x=s} \exp(ix^2) dx \qquad (1)$$

In some examples, the computing device(s) may perform the processes described herein on clothoid sections wherein the curvature of the clothoid section does not change directions and the change in the tangent angle is no more than ninety degrees.

In some examples, the reference line may be received as map data representing an environment. Techniques for generating reference lines may be found, for example, in U.S. Pat. Application No. 15/843,512 titled "*Trajectory Generation Using Curvature Segments*" and filed Dec. 15, 2017, and U.S. Pat. Application No. 16/517,506, titled "*Unstructured Vehicle Path Planner*" and filed Jul. 19, 2019, which are incorporated by reference herein in their entirety.

The computing device(s) may then want to determine minimum distances between points within the environment (also referred to as "test points"), such as points that correspond to locations of objects, and the reference line. In some instances, it may be difficult to determine the minimum distance between a test point and a reference line when the reference line includes a spiral. This is because the closest point along the reference line to the test point may include a first endpoint (also referred to as a "starting point") of the segment, a second endpoint (also referred to an "ending point") of the segment, and/or one or more points that are located between the first endpoint and the second endpoint. It is because of this, to determine the minimum distance, the computing device(s) may initially identify regions associated with a reference line (e.g., a reference line that includes a spiral) and use the regions to determine the minimum distance.

For example, techniques may include dividing the xy-plane into regions. In some examples, to divide the xy-plane, the computing device(s) may determine a first line that is normal to the reference line at a first endpoint of the reference line (e.g., the starting point, which may include the lower curvature endpoint), a second line that is normal to the reference line at a second endpoint of the reference line (e.g., the ending point, which may include the higher curvature endpoint), a third line that corresponds to a perpendicular bisector of a line segment joining the first endpoint and the second endpoint, a fourth line that represents a curved edge that separates the x-y plane into regions such that points belonging to one region are closer to the second endpoint than any other point inside the reference line and points within the other region closer to some point inside the reference line than they are to the second endpoint, and/or a fifth line that extends between the ends of the fourth line. In some examples, dividing the xy-plane into regions may correspond to associating a Voronoi Diagram with the reference line. The computing device(s) may then use the lines to determine the regions associated with the reference line.

For example, the computing device(s) may associate the regions with rules and/or equations for identifying the minimum distances between test points located within the regions to the reference line. For instance, the computing device(s) may associate a first region with a first rule that indicates that the closest reference point to test points located within the first region is a first endpoint of the reference line. The computing device(s) may also associate a second region with a second rule that indicates that a closest reference point to test points located within the second region is a second endpoint of the reference line. Additionally, the computing device(s) may associate a third region with a third rule that indicates that a closest reference point to test points located within the third region is either the first endpoint or the second endpoint of the reference line. Furthermore, the computing device(s) may associate a fourth region with a fourth rule that indicates that a closest reference point to test points located within the fourth region is between the first endpoint and the second endpoint of the reference line. The computing device(s) may then use these rules for determining the minimum distances between test points and the reference line.

For a first example, the computing device(s) may determine that a first test point is located within the first region of the regions. As such, the computing device(s) may determine that the minimum distance between the first test point and the reference line is the distance between the location of the first test point and the location of the first endpoint of the reference line within the environment. For a second example, the computing device(s) may determine that a second test point is located within the second region of the regions. As such, the computing device(s) may determine that the minimum distance between the second test point and the reference line is the distance between the location of the second test point and the location of the second endpoint of the reference line within the environment.

For a third example, the computing device(s) may determine that a third test point is located within the third region of the regions. As such, the computing device(s) may determine a first distance between the location of the third test point and the location of the first endpoint of the reference line within the environment and a second distance between the location of the third test point and the location of the second endpoint of the reference line within the environment. The computing device(s) may then determine that the minimum distance between the third test point and the reference line is the shortest distance between the first distance and the second distance. For a fourth example, the computing device(s) may determine that a fourth test point is located within the fourth region of the regions. As such, the computing device(s) may determine that the minimum distance between the fourth test point and the reference line is the shortest distance between the location of the fourth test point and the locations of the reference points of the reference line that are between the first endpoint and the second endpoint. As discussed with respect to the example of FIG. 4, the computing device(s) may use the Brent Minimization Algorithm to determine the minimum distance. However, in other examples, the computing device(s) may use any type of minimization algorithm such as, but not limited to, Bisection, Newton Raphson, and/or the like.

In some instances, the computing device(s) use the lines when determining the regions associated with the test points. For example, the computing device(s) may determine that the first test point is located within the first region based on the first test point being located to a first side of the first line and a first side of the second line, the second test point is located within the second region based on the second test point being located to the first side of the first line and a second side of the second line, the third test point is located within the third region based on the third test point being located to a second side of the first line and the first side of the second line, and the fourth test point is located within the fourth region based on the third test point being located to the second side of the first line and the second side of the second line. In some instances, the computing device(s) determine which sides of the lines the test points are associated with using one or more algorithms, such as a derivative of a distance function, which are described in more detail below.

In some instances, the computing device(s) may further determine that test points are located within sub-regions of a region. For instance, and as discussed above, the computing device(s) may segment the xy-plane using the third line that corresponds to a perpendicular bisector of a line segment joining the first endpoint and the second endpoint of the reference line, the fourth line, and/or the fifth line that extends between the ends of the fourth line. As such, the computing device(s) may determine sub-regions as portions of the region that are between the third line, the fourth line, and/or the fifth line. The computing device(s) may then determine which sub-regions test points are located within based on which sides of the third line, the fourth line, and the fifth line the test points are located on.

Additionally, and similar to the regions above, the computing device(s) may associate sub-regions with rules and/or equations for identifying the minimum distances between test points located within the sub-regions and the reference line. In some examples, the computing device(s) use similar rules and/or equations for the sub-regions as the computing device(s) use for the regions. In some examples, the computing device(s) use different rules and/or equations for the sub-regions as the computing device(s) use for the regions. In either example, the computing device(s) may then use the rules and/or equations to determine the minimum distances.

In some instances, the computing device(s) may use the minimum distance(s) between test point(s) and the reference line to determine one or more actions for the autonomous vehicle to perform. For example, the computing device(s) may determine, based at least in part on the minimum distance(s) between test point(s) (e.g.., location(s) of object(s)) and the reference line, one or more costs associated with one or more trajectories that the autonomous vehicle may navigate. The computing device(s) may then select a trajectory based on the one or more costs. For example, the computing device(s) may select the trajectory that includes the lowest cost for the computing device(s). Techniques for determining and using costs may be found, for example, in U.S. Pat. Application No. 16/147,492, titled "*Trajectory Generation and Optimization Using Closed-Form Numerical Integration in Route-Relative Coordinates*" and filed Sep. 28, 2018, and U.S. Pat. Application No. 16/179,679, titled "*Adaptive Scaling in Trajectory Generation*" and filed Nov. 2, 2018, which are incorporated by reference herein in their entirety.

The operations for optimizing the lateral dynamics and longitudinal dynamics using such equation(s) can improve a functioning of a computer device by providing robust, and fast, generation of vehicle controls. For example, conventional techniques for determining a distance between a point and a line segment that represent a spiral included performing global samples, which is slow, derivative based optimization, which may get stuck in local minimum, and approximation, which may not be accurate. By performing the segmentation techniques described herein, the computing device(s) are able to accurately, and quickly, determine the shortest distance between a point and the line segment.

For example, previous techniques may include discretizing line segments using samples along the curve for computing minimum distances, which may be slow, convex optimization techniques, which are prone to error, and approximating the line segment with simpler geometries, which is prone to errors. However, by performing the techniques described herein, the computing device(s) are able to accurately, and quickly, determine the shortest distance between a point and the line segment.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system evaluating distances between reference lines in an environment (e.g., in a system using route-relative planning). Additionally, the techniques described herein may be used with real data (e.g., captured using sensor(s)), simulated data (e.g., generated by a simulator), or any combination of the two.

FIG. 1 is a pictorial flow diagram of an example process 100 for determining a distance between points within an environment and a reference line, in accordance with embodiments of the disclosure. At operation 102, the process 100 may include identifying or receiving a reference line associated with a road segment. For instance, an example 104 illustrates that a vehicle 106 may be navigating along the road segment 108. While navigating, the vehicle 106 may identify the reference line 110 associated with the road segment 108, e.g., as may be associated with a map of the environment and/or road segment 108. As shown, the reference line 110 includes both a starting point 112 and an ending point 114. In the example of FIG. 1, the reference line 110 may include a clothoid that represents the road segment 108. However, in other examples, the reference line 110 may include any other type of line (e.g, Bezier curves, splines, polynomials, or otherwise). In some examples, the operation 102 may include receiving map data and determining that a reference line is associated with a road segment in which the vehicle is traveling.

Figure 2A:
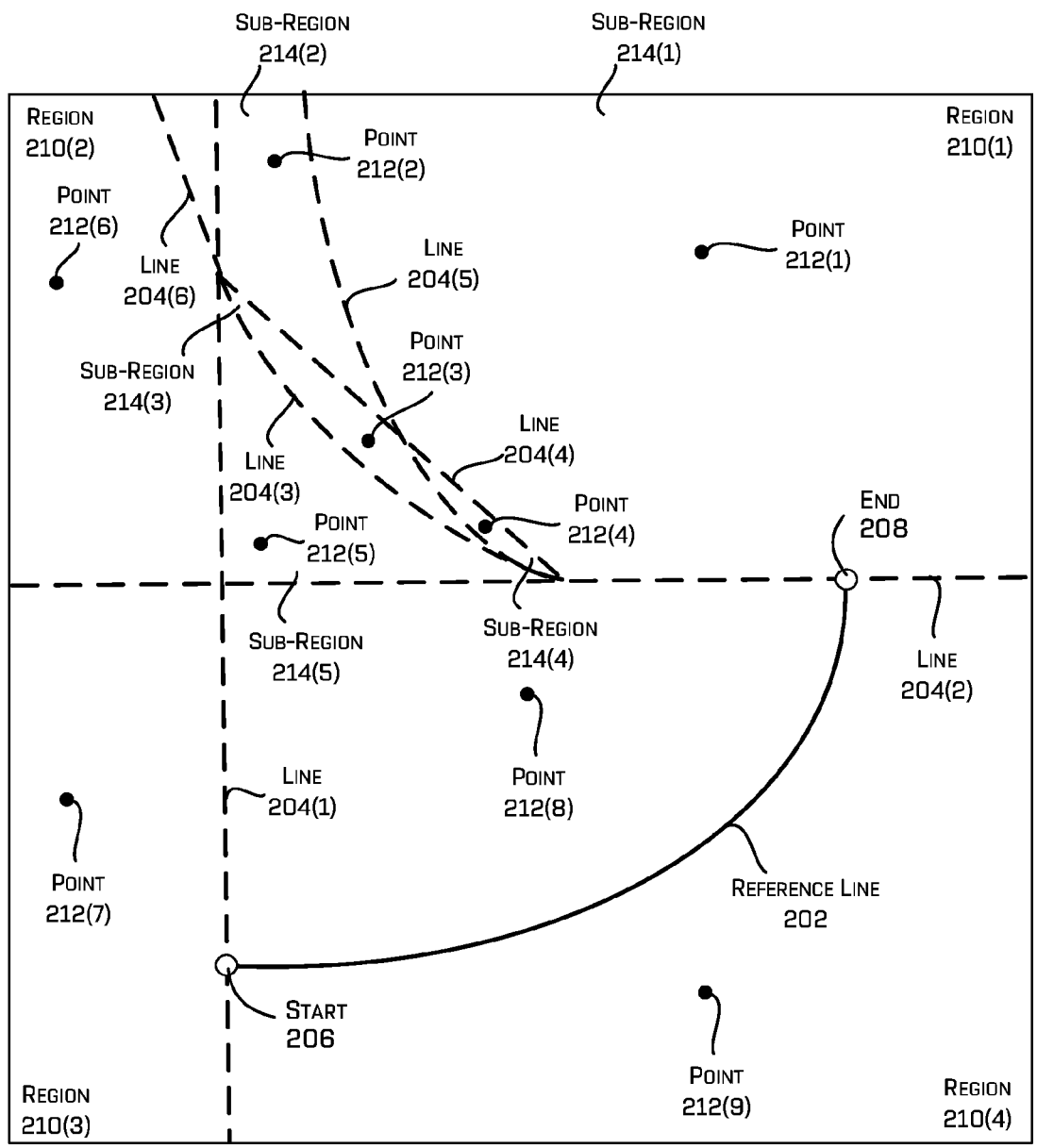
FIG. 2A illustrates an example of determining regions associated with a reference line and then determining distances between points and the reference line using the regions, in accordance with embodiments of the disclosure.

At operation 116, the process 100 may include identifying region(s) associated with the reference line 110. For instance, an example 118 illustrates that the vehicle 106 may determine the regions 120(1)-(3) (also referred to as "regions 120") associated with the reference line 110. In some instances, the vehicle 106 determines the regions 120 using lines 122(1)-(4) (also referred to as "lines 122"). In the example of FIG. 1, the first line 122(1) may be normal to the starting point 112 of the reference line 110, the second line 122(2) may be normal to the ending point 114 of the reference line 110, the third line 122(3) may correspond to a perpendicular bisector of a line segment joining the starting point 112 and the ending point 114, and the fourth line 122(4) may represent a curved edge. However, in other examples, the vehicle 106 may use additional and/or alternative lines when determining the regions 120. Additionally, in other examples, and as shown by the example of FIG. 2A, the vehicle 106 may determine more fewer less regions 120.

At operation 124, the process 100 may include determining that a point is associated with a region from the region(s). For instance, an example 126 illustrates the vehicle 106 determining that the point 128 is located within the second region 120(2). In the example of FIG. 1, the point 128 may correspond to a location of an object 130 that was located within the environment and proximate to the road segment 108. In some examples, and as discussed in more detail below, the vehicle 106 may determine that the point 128 is located within the second region 120(2) using one or more algorithms.

At operation 132, the process 100 may include determining a minimum distance between the point and the reference line using the region. For instance, an example 134 illustrates the vehicle 106 determining the minimum distance 136 between the point 128 and the reference line 110. In some instances, to determine the minimum distance 136, the vehicle 106 may determine that the second region 120(2) is associated a rule that indicates that the closest reference point to the point 128 is the ending point 114 of the reference line 110. As such, the vehicle 106 may determine the minimum distance 136 as the distance between the location of the point 128 and the location of the ending point 114 within the environment.

In some instances, the vehicle 106 may then determine one or more actions to perform based on the minimum distance 136. For example, the vehicle 106 may determine to continue along the trajectory, determine a new trajectory, determine to change a velocity, determine to stop, and/or the like.

FIG. 2A illustrates an example of determining regions associated with a reference line and then determining distances between points and the reference line using the regions, in accordance with embodiments of the disclosure. For instance, the vehicle 106 may initially receive or determine a reference line 202 that represents at least a portion of a road segment. In the example of FIG. 2A, the reference line 202 may include at least a portion of a spiral line or a spiral line segment that represents the portion of the road segment. For example, the reference line 202 may include a clothoid that represents the road segment, where the reference line 202 is generated by translating, scaling, and rotating a clothoid section.

The vehicle 106 (and/or one or more other devices) may then determine lines 204(1)-(5) (also referred to as "lines 204") using the reference line 202. In the example of FIG. 2A, the first line 204(1) may include a line that is normal to a starting point 206 of the reference line 202, the second line 204(2) may include a line that is normal to an ending point 208 of the reference line 202, the third line 204(3) may include a curved line (e.g., a Voronoi edge) that separates points that map to the endpoints 206, 208 of the reference line 202 and points that map between the end points 206, 208 of the reference line 202, the fourth line 204(4) may include a line that joins the ends of the third line 204(3) (e.g., a first end that includes an intersect between the first line 204(1) and the third line 204(3) and a second end that includes an intersect between the second line 204(2) and the third line 204(3)), the fifth line 204(5) may include a locus of the intersection point of the two normal on the reference line 202, and a sixth line 204(6) that includes a perpendicular bisector of a line that joins the endpoints 206, 208 of the reference line 202. As described herein, the Evolute may include the locus of all of the centers of the curvature of the reference line 202. In some instances, the Evolute may be determined by the following equation:

$$E(s) = c(s) + p(s)n(s) \quad (2)$$

In equation (2), c(s) is the equation for the road segment parameterized by arc-length s, n(s) is normal to c, and p(s) is the radius of the curvature of c at s.

The vehicle 106 (and/or the one or more other devices) may then determine regions 210(1)-(4) (also referred to as "regions 210") using one or more of the lines 204. For example, the vehicle 106 may determine that the first region 210(1) is located at a first side of the first line 204(1) (e.g., a right side in the example of FIG. 2A) and a first side of the second line 204(2) (e.g., a top side in the example of FIG. 2A), the second region 210(2) is located at a second side of the first line 204(1) (e.g., a left side in the example of FIG. 2A) and the first side of the second line 204(2), the third region 210(3) is located at the second side of the first line 204(1) and a second side of the second line 204(2) (e.g., a bottom side in the example of FIG. 2A), and the fourth region 210(4) is located at the first side of the first line 204(1) and the second side of the second line 204(2).

The vehicle 106 (and/or the one or more other devices) may then use the regions 210 to determine the minimum distances between points 212(1)-(9) (also referred to as "points 212") and the reference line 202. For example, the vehicle 106 may initially associate the points 212 with the regions 210. In some examples, the vehicle 106 may associate the points 212 with the regions 210 using one or more equations. For example, the vehicle 106 may use a derivative of a distance function to determine which sides of the lines 204 the points 212 lie on. For instance, and using the example of FIG. 2A, the vehicle 106 may use the following equations:

$$\text{Region } 210(1): d'(s_{\min}, p) \leq 0, d'(s_{\max}, p) \leq 0 \quad (3)$$

$$\text{Region } 210(2): d'(s_{\min}, p) \geq 0, d'(s_{\max}, p) \leq 0 \quad (4)$$

$$\text{Region } 210(3): d'(s_{\min}, p) \geq 0, d'(s_{\max}, p) \geq 0 \quad (5)$$

$$\text{Region } 210(4): d'(s_{\min}, p) \leq 0, d'(s_{\max}, p) \geq 0 \quad (6)$$

In equations (2)-(5), $s_{min}$ may include the minimum point on the reference line 202 (e.g., the starting point 206), $s_{max}$ may include the maximum point on the reference line 202 (e.g., the ending point 208), and p may include .... As shown, if equation (2) is satisfied, then the point (e.g., the points 212 (1)-(5) may be located within the first region 210(1). Additionally, if equation (3) is satisfied, then the point (e.g., the point 212(6) may be located in the second region 210(2). Furthermore, if equation (4) is satisfied, then the point (e.g., the point 212(7) may be located in the third region 210(3). Moreover, if equation (5) is satisfied, then the point (e.g., the points 212(8)-(9) may be located in the fourth region 210(4).

In some instances, the vehicle 106 (and/or the one or more other devices) may then determine the minimum distances for points 212(6)-(9) that are located within the regions 210 (2)-(4). For a first example, the vehicle 106 may use a rule indicating that points that are located within the second region 210(2) are closest to the starting point 206 of the reference line 202 or the ending point 208 of the reference line 202. As such, to determine the minimum distance for the point 212(6), the vehicle 106 may determine a first distance between a location of the point 212(6) and a location of the starting point 206 and a second distance between the location of the point 212(6) and the location of the ending point 208. The vehicle 106 may then determine that the minimum distance is the smallest distance between the first distance and the second distance.

For a second example, the vehicle 106 may use a rule indicating that points that are located within the third region 210(3) are closest to the starting point 206 of the reference line 202. As such, to determine the minimum distance for the point 212(7), the vehicle 106 may determine the distance between a location of the point 212(7) and the location of the starting point 206. For a third example, the vehicle 106 may use a rule indicating that points that are located within the fourth region 210(4) may be closest to some point along the reference line 202. As such, to determine the minimum distance for the point 212(8) (and/or similarly the point 212 (9)), the vehicle 106 may determine distances between a location of the point 212(8) and locations of the points along the reference line 202. The vehicle 106 may then determine the minimum distance as the smallest distance among the determined distances. In some instances, the vehicle 106 may determine the minimum distance using an optimization algorithm, such as the Brent Minimization Algorithm.

In some instances, the vehicle 106 (and/or the one or more other devices) may make one or more other determinations for points 212(1)-(5) that are located within the first region 210(1). For example, the vehicle 106 may initially associate the points 212(1)-(5) with sub-regions 214(1)-(5) (also referred to as "sub-regions 214") of the first region 210(1). To associate the points 212(1)-(5) with the sub-regions 214, the vehicle 106 may initially determine whether the points 212(1)-(5) are located on a first side of the fourth line 204(4) (e.g., the right side in the example of FIG. 2A) or a second side of the fourth line 204(4) (e.g., the left side in the example of FIG. 2A). In the example of FIG. 2A, the vehicle 106 may determine that the points 212(1)-(2) are located on the first side and that the points 212(3)-(5) are located on the second side. Additionally, the vehicle 106 may determine that the point 212(1) is located within the first sub-region 214(1) and the point 212(2) is located within the second sub-region 214(2).

Next, the vehicle 106 may use a rule indicating that points that are located within the sub-regions 214(1)-(2) are closest to the ending point 208 of the reference line 202. As such, to determine the minimum distance for the point 212(1), the vehicle 106 may determine the distance between a location of the point 212(1) and the location of the ending point 208. Additionally, to determine the minimum distance for the point 212(2), the vehicle 106 may determine the distance between a location of the point 212(2) and the location of the ending point 208.

With regard to the points 212(3)-(5), the vehicle 106 (and/or the one or more other devices) may make one or more additional determinations for determining the minimum distances. For example, the vehicle 106 may initially determine that the points 212(3)-(5) located within the first region 210 (1) include one root in the second derivative of distance along the segment, d'', where d' is the distance function. The vehicle 106 may also determine that points 212(3) and 212(5) located within the sub-regions 214(3) and 214(5), respectively, include two roots in the first derivative along the segment, d', while the point 212(4) located within the fourth sub-region 214(4) includes no roots in d'. Using these determinations, the vehicle 106 may associate the points 212(3)-(5) with the sub-regions 214(3)-(5).

Figure 2B:
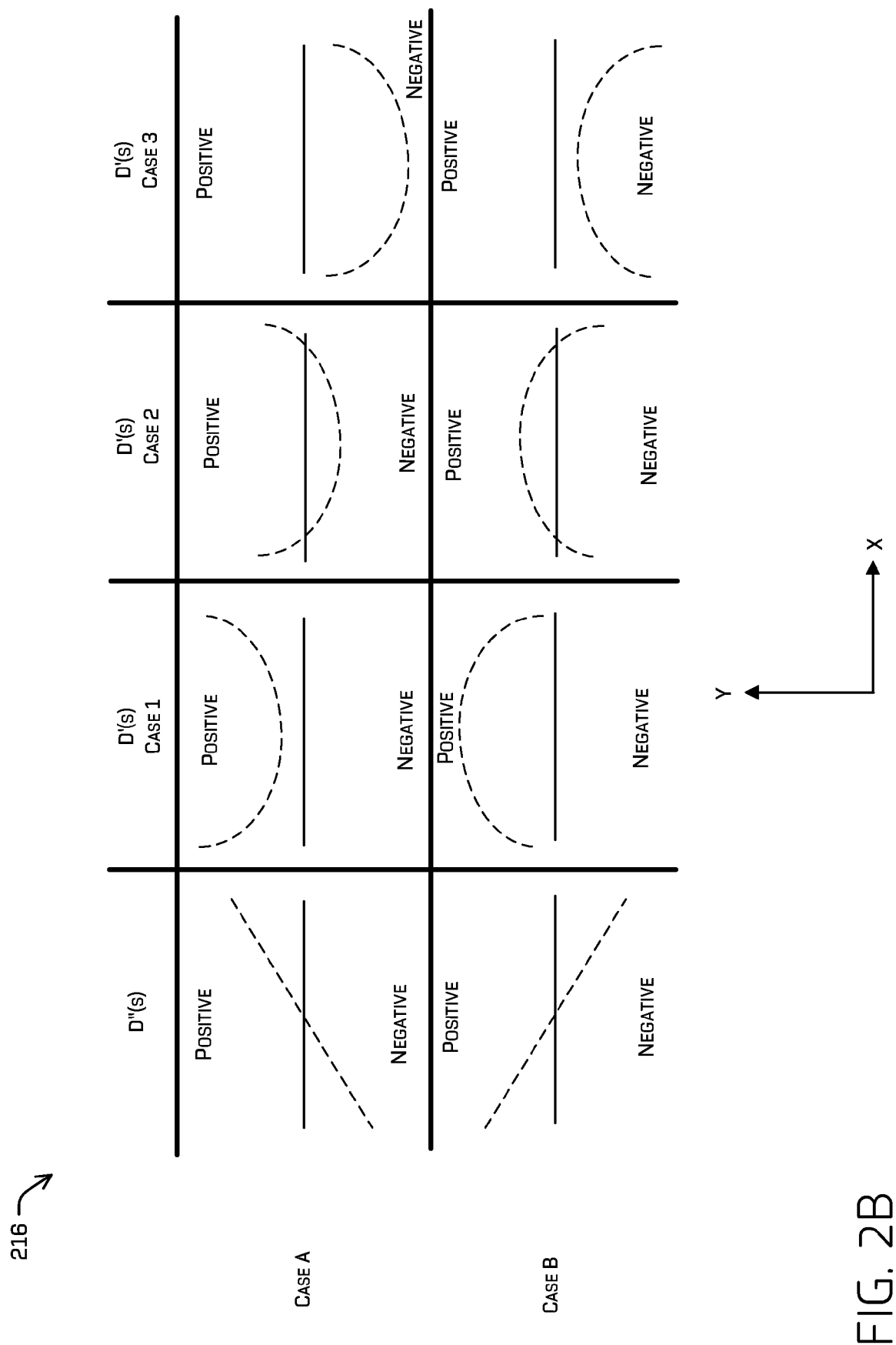
FIG. 2B illustrates an example table for associating points with sub-regions from the example of FIG. 2A, in accordance with embodiments of the disclosure.

For example, FIG. 2B illustrates an example table 216 for associating points 212(3)-(5) within sub-regions 214(3)-(5) from the example of FIG. 2A, in accordance with embodiments of the disclosure. For instance, the vehicle 106 may use various conditions for associating the points 121(3)-(5) with the sub-regions 214(3)-(5). For example, a first condition may restrict performing the processes described herein using reference lines that have, at most, one region that allows two normals and no regions with three or more normals (e.g., d' will have no more than two roots). This means that, in some examples, the vehicle 104 may restrict performing the processes described herein to reference lines that include tangent angle differences at the end points of the reference lines that are no more than ninety degrees. As such, the vehicle 106 may only need to look at d' candidates where the values of d' at a starting point and an ending point are negative. Using the table 216, this includes Case A3, Case B2, and Case B3.

Next, and as discussed above, a second condition may indicate that points located within the sub-regions 214(3) and 214(5) include two roots in d'. As such, and using the table 216, the vehicle 106 may determine that, since the points 212(3) and 212(5) are respectively located within the sub-regions 214(3) and 214(5), then the only acceptable shape of d' for the points 212(3) and 212(5) is Case B3. Finally, a third condition may indicate that points located within the fourth sub-region 214(4) include no roots in d'. As such, and again using the table 216, the vehicle 106 may determine that, since the point 212(4) is located within the fourth sub-region 214(4), then the acceptable shapes of d' for the point 212(4) is Case A3 or Case A4.

For example of using these conditions, the vehicle 106 may use the Brent Minimization Algorithm on d' in order to determine (S,d'(S)), where S is a distance along the reference line 202 and d'(S) is the maximum value of the distance derivative. The vehicle 106 may then determine that if d'(S) < 0, the point is within the fourth sub-region 214(4). For example, the vehicle 106 may use the equations above to determine that d'(S) < 0 for the point 212(4). The vehicle 106 may also determine that points that are located within the fourth sub-region 214(4) may be closest to the ending point 208 of the reference line 202. As such, to determine the minimum distance for the point 212(4), the vehicle 106 may determine the distance between a location of the point 212(4) and the location of the ending point 208.

The vehicle 106 (and/or the one or more devices) may also determine that the point 212(3) is within the third sub-region 214(3). In some instances, the vehicle 106 makes the determination by comparing a first distance between a location of the point 212(3) and the location of the ending point 208 of the reference line 202 (which may be referred to as "$d(s_{max})$") to a minimum distance between the location of the point 212(3) and points located between the starting point 206 and the ending point 208 along the reference line 202 (which may also be referred to as "$d(s_{opt})$"). The vehicle 106 may then determine that the point 212(3) is within the third sub-region 214(3) based on the first distance being less than the minimum distance (e.g., based on $d(s_{max}) < d(s_{opt})$").

The vehicle 106 may then determine that points that are located within the third sub-region 214(3) may be closest to the ending point 208 of the reference line 202. As such, to determine the minimum distance for the point 212(3), the vehicle 106 may determine the distance between the location of the point 212(3) and the location of the ending point 208. This determination is further verified by the fact that the vehicle 106 determined that $d(s_{max}) < d(s_{opt})$.

The vehicle 106 (and/or the one or more devices) may also determine that the point 212(5) is within the fifth sub-region 214(5). In some instances, the vehicle 106 makes the determination by comparing a first distance between a location of the point 212(5) and the location of the ending point 208 of the reference line 202 (which again may be referred to as "$d(s_{max})$") to a minimum distance between the location of the point 212(5) and points located between the starting point 206 and the ending point 208 along the reference line 202 (which again may also be referred to as "$d(s_{opt})$"). The vehicle 106 may then determine that the point 212(5) is within the fifth sub-region 214(5) based on the first distance being greater than the minimum distance (e.g., based on $d(s_{max}) > d(s_{opt})$"). As such, the vehicle 106 may determine that the minimum distance for the point 212(5) includes the minimum distance between the location of the point 212(5) and points located between the starting point 206 and the ending point 208 along the reference line 202 (e.g., $d(s_{opt})$).

While these are just some examples of using regions and/or sub-regions to determine distances between points and a reference line, in other examples, the vehicle 106 (and/or the one or more other devices) may use additional and/or alternative rules. Additionally, in some examples, the reference line 202 may include more or less regions and/or sub-regions.

Figure 2C:
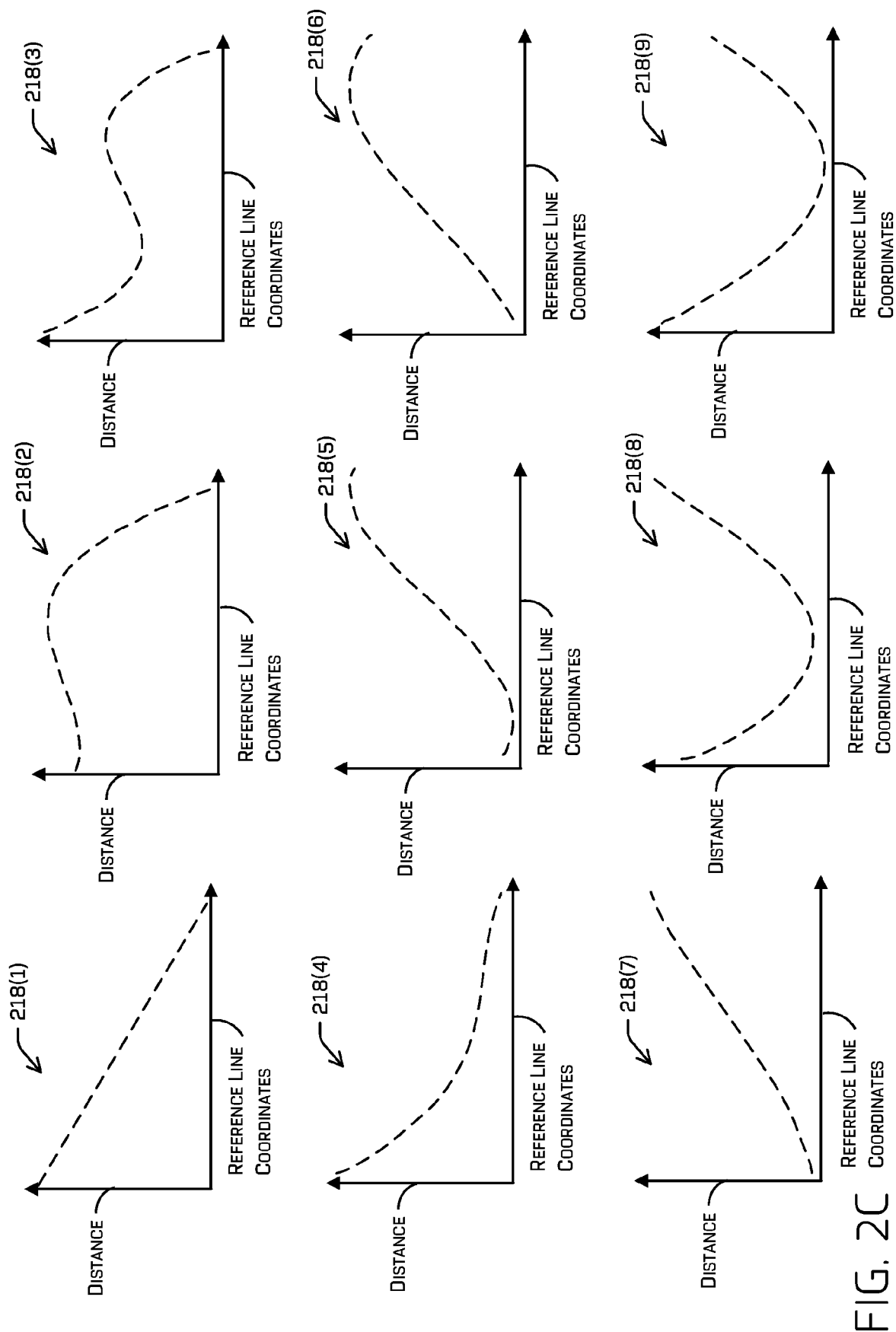
FIG. 2C illustrates example tables showing the distances between the points and the reference line from the example of FIG. 2A, in accordance with embodiments of the disclosure.

FIG. 2C illustrates example tables 218(1)-(9) showing the distances between the points 212(1)-(9), respectively, and the reference line 202 from the example of FIG. 2A, in accordance with embodiments of the disclosure. In the example of FIG. 2C, the x-axis may represent the coordinates along the reference line 202 starting at the starting point 206 and ending at the ending point 208 and the y-axis may represent the distance between the points 212 and the reference line 202.

As shown, the first graph 218(1), the second graph 218(2), the third graph 218(3), and the fourth graph 218(4) show that the closest point to the point 212(1), the point 212(2), the point 212(3), and the point 212(4), respectively, includes the ending point 208 of the reference line 202. Also, the fifth graph 218(5), the eighth graph 218(8), and the ninth graph 218(9) show that the closest point to the point 212(5), the point 218(8), and the point 218(9), respectively, is between the starting point 206 and the ending point 208 of the reference line 202. Finally, the fifth graph 218(5), the sixth graph 218(6), and the seventh graph 218(7) show that the closest point to the point 212(5), the point 212(6), and the point 212(7), respectively, includes the starting point 206 of the reference line 202.

Figure 3:
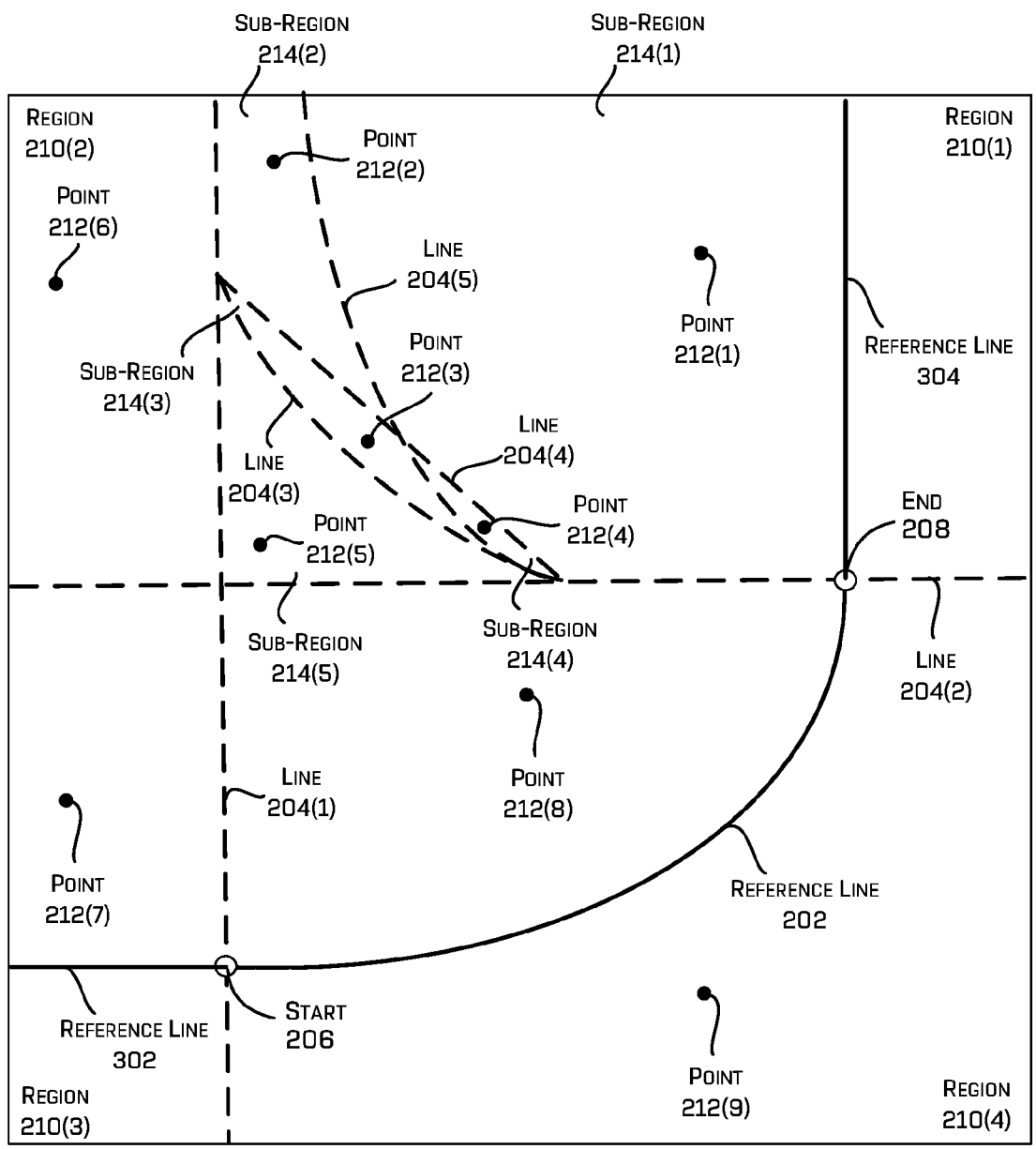
FIG. 3 illustrates another example of using the regions associated with the reference line from FIG. 2A in order to determine distances between points and additional reference lines, in accordance with embodiments of the disclosure.

FIG. 3 illustrates another example of using the regions associated with the reference line from FIG. 2A in order to determine distances between points and additional reference lines, in accordance with embodiments of the disclosure. For example, the reference line 202 may represent a segment of a larger reference line that also includes a reference line 302 that is associated with a road segment that is before the road segment represented by the reference line 202 and a reference line 304 that is associated with a road segment that is after the road segment represented by the reference line 202. In some instances, the vehicle 106 may use the regions 210 and/or the sub-regions 214 to determine that the points 212 are located closer to the reference lines 302, 304 than the reference line 202.

For example, the vehicle 106 may determine that points (e.g., the point 212(7)) located within the third region 210(3) may be located closer to the reference line 302 than the reference lines 202, 304. Additionally, the vehicle 106 may determine that points (e.g., the points 212(8), 212(9)) located within the fourth region 210(4) are closer to the reference line 202 than either of the reference lines 302, 304. Furthermore, the vehicle 106 may determine that points (e.g., the points 212(1)-(5)) located within the first region 210(1) may be located closest to the reference line 202 and/or the reference line 304. Moreover, the vehicle 106 may determine that points (e.g., the point 212(6)) located with the second region 210(2) may be located closest to the reference line 302 and/or the reference line 304. While this may be true for the example of FIG. 3, in other examples, the vehicle 106 may make different assumptions based on the shapes and/or directions of each of the reference lines 202, 302, and 304.

Figure 4:
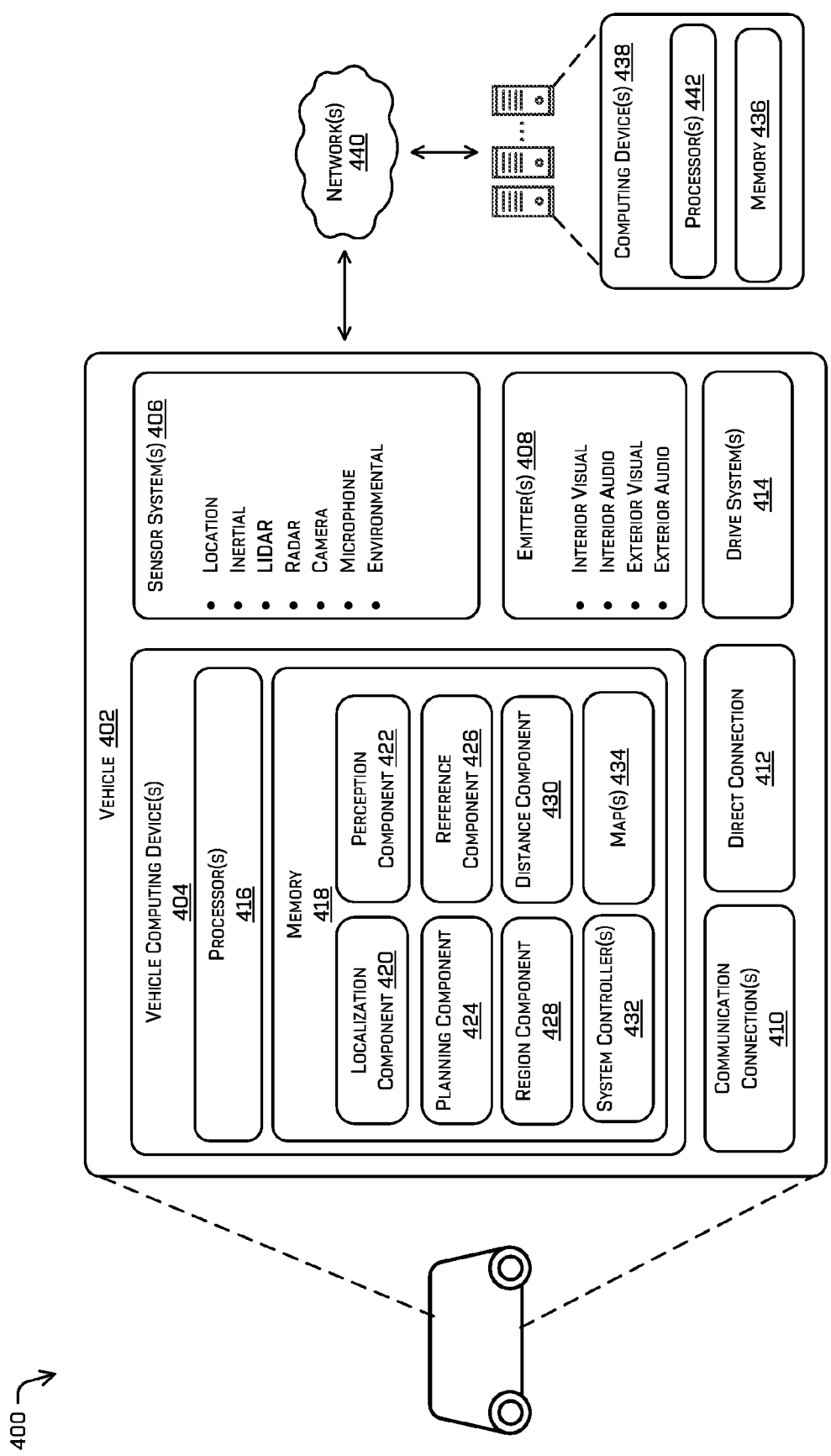
FIG. 4 is a block diagram of an example system for implementing the techniques described herein, in accordance with embodiments of the disclosure.

FIG. 4 is a block diagram of an example system 400 for implementing the techniques described herein. In at least one example, the system 400 may include a vehicle 402, such as the vehicle 106.

The vehicle 402 may include a vehicle computing device(s) 404, one or more sensor systems 406, emitter(s) 408, one or more communication connections 410, at least one direct connection 412, and one or more drive systems 414.

The vehicle computing device(s) 404 may include one or more processors 416 and memory 418 communicatively coupled with the processor(s) 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In the illustrated example, the memory 418 of the vehicle computing device(s) 404 stores a localization component 420, a perception component 422, a planning component 424, a reference component 426, a region component 428, a distance component 430, one or more system controllers 432, and one or more maps 434. Though depicted in FIG. 4 as residing in the memory 418 for illustrative purposes, it is contemplated that the localization component 420, the perception component 422, the planning component 424, the reference component 426, the region component 428, the distance component 430, the system controller(s) 432, and/or the map(s) 434 may additionally, or alternatively, be accessible to the vehicle 402 (e.g., stored on, or otherwise accessible by, memory remote from the vehicle 402, such as, for example, on memory 436 of a remote computing device(s) 438.

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request / receive a map of an environment and may continuously determine a location and/or orientation of the vehicle 402 within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 420 may provide data to various components of the vehicle 402 to determine an initial position of the vehicle 402 for generating a path polygon associated with the vehicle path, as discussed herein.

In some instances, the perception component 422 may include functionality to perform object detection, segmentation, and/or classification. In some examples, the perception component 422 may provide processed sensor data that indicates a presence of an agent (e.g., entity) that is proximate to the vehicle 402 and/or a classification of the agent as an agent type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more characteristics associated with a detected agent (e.g., a tracked object) and/or the environment in which the agent is positioned. In some examples, characteristics associated with an agent may include, but are not limited to, an x-position (global and/or local position), a y-position (global and/or local position), a z-position (global and/or local position), an orientation (e.g., a roll, pitch, yaw), an agent type (e.g., a classification), a velocity of the agent, an acceleration of the agent, an extent of the agent (size), etc. Characteristics associated with the environment may include, but are not limited to, a presence of another agent in the environment, a state of another agent in the environment, a time of day, a day of a week, a season, a weather condition, an indication of darkness/light, etc.

In general, the planning component 424 may determine a path for the vehicle 402 to follow to traverse through an environment. For example, the planning component 424 may determine various routes and trajectories and various levels of detail. For example, the planning component 424 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 424 may generate an instruction for guiding the autonomous vehicle along at least a portion of the route from the first location to the second location. In at least one example, the planning component 424 may determine how to guide the vehicle 402 from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 402 to navigate.

In some examples, the planning component 424 may include a prediction component to generate predicted trajectories of objects (e.g., agents) in an environment. For example, a prediction component may generate one or more predicted trajectories for agents within a threshold distance from the vehicle 402. In some examples, a prediction component may measure a trace of an object and generate a trajectory for the object based on observed and predicted behavior.

In some instances, the reference component 426 may include functionality for identifying reference lines associated with road segments. In some examples, the vehicle 106 may store the reference lines associated with the road segments. In such examples, while navigating along a road segment, the reference component 426 may identify a reference line associated with the road segment by searching through and identifying the reference line that corresponds to (e.g., maps to) to the road segment. Additionally, or alternatively, in some examples, the reference component 426 may generate a reference line for a road segment. For example, as the vehicle 402 as navigating, the vehicle 402 may identify a road segment that is along a path of the vehicle 402. The vehicle 402 may then generate the reference line that represents the road segment. As described herein, in some examples, the reference line may include one or more line segments, one or more circular arcs, and/or one or more spirals In some instances, the region component 428 may include functionality to determine regions and/or sub-regions associated with a reference line, such as described herein. For example, the region component 428 may divide the xy-plane using at least a first line that is normal to the starting point of the reference line, a second line that is normal to the ending point of the reference line, a third line that corresponds to a perpendicular bisector of a line segment joining the starting point and the ending point, a fourth line that represents a curved edge, and/or a fifth line that connects the ends of the fourth line. The region component 428 may then use the lines to identify the regions and/or sub-regions associated with the reference line (e.g., using the processes described above).

The region component 428 may further include functionality for determining that points are located within specific regions and/or sub-regions. For example, the region component 428 may initially use one or more of the processes described above (e.g., Equations 2-5) to determine that a point is located within a region. Additionally, when a region includes multiple sub-regions (e.g., similar to the first region 210(1) from the example of FIG. 2A), then the region component 428 may perform the processes described above to determine that the point is located within a sub-region. As described herein, in some examples, the points may correspond to locations of objects located within an environment for which the vehicle 402 is navigating.

In some instances, the distance component 430 may include functionality to determine the minimum distances between the points and reference points of the reference line. For instance, the distance component 430 may use rule(s) and/or equation(s) to determine the minimum distances based on the regions for which the points are located. For a first example, the distance component 430 may store a first rule that indicates that points included in a first region are closest to a starting point of the reference line. As such, the distance component 430 may use the first rule and/or a first equation to determine that the minimum distance between a point within the first region and the reference line is the distance between a location of the point and a location of the starting point of the reference line. For a second example, the distance component 430 may store a second rule that indicates that points included in a second region are closest to a ending point of the reference line. As such, the distance component 430 may use the second rule and/or a second equation to determine that the minimum distance between a point within the second region and the reference line is the distance between a location of the point and a location of the ending point of the reference line.

For a third example, the distance component 430 may store a third rule that indicates that points included in a third region are closest to the starting point or the ending point of the reference line. As such, the distance component 430 may use the third rule and/or a third equation to determine that the minimum distance between a point within the third region and the reference line is the shortest distance between a first distance between a location of the point and the location of the ending point or a second distance between the location of the point and the location of the ending point. For a fourth example, the distance component 430 may store a fourth rule indicating that points included in a fourth region are closest to a reference point that is between the starting point and the ending point. As such, the distance component 430 may use the fourth rule and/or a fourth equation to determine that the minimum distance between a point within the fourth region and the reference line is the shortest distance between a location of the point and locations of reference points of the reference line.

It should be noted that, while these are just a couple of examples of rules and/or equations that the distance component 430 may use to determine the minimum distances, in other examples, the distance component 430 may use additional and/or alternative rules and/or equations. Additionally, it should be noted that although the example of FIG. 4 illustrates the reference component 426, the region component 428, and the distance component 430 as including separate components, in other examples, the reference component 426, the region component 428, and/or the distance component 430 may be included within the localization component 420, the perception component 422, and/or the planning component 424.

In at least one example, the vehicle computing device(s) 404 may include the system controller(s) 432, which may be configured to control steering, propulsion, braking, safety, emitters, communication, and other systems of the vehicle 402. The system controller(s) 432 may communicate with and/or control corresponding systems of the drive system(s) 414 and/or other components of the vehicle 402.

The memory 418 may further include the map(s) 434 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 434. That is, the map(s) 434 may be used in connection with the localization component 420, the perception component 422, and/or the planning component 424 to determine a location of the vehicle 402, detect objects in an environment, and/or generate routes and/or trajectories to navigate within an environment.

In some examples, the map(s) 434 may be stored on a remote computing device(s) (such as the computing device(s) 438) accessible via network(s) 440. In some examples, multiple maps 434 may be stored based on, for example, a characteristic (e.g., type of entity, time of day, day of week, season of the year, etc.). Storing multiple maps 434 may have similar memory requirements, but increase the speed at which data in a map may be accessed.

As can be understood, the components discussed herein (e.g., the localization component 420, the perception component 422, the planning component 424, the reference component 426, the region component 428, the distance component 430, the system controller(s) 432, and/or the one or more maps 434 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 418 (and the memory 436, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naive Bayes, Gaussian naïve Bayes, multinomial naive Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the LIDAR sensors may include individual LIDAR sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device(s) 404. Additionally or alternatively, the sensor system(s) 406 may send sensor data, via the one or more networks 652, to the one or more computing device(s) 650 at a particular frequency, after a lapse of a predetermined period of time, in near real-time, etc.

The vehicle 402 may also include emitter(s) 408 for emitting light and/or sound, as described above. The emitter(s) 408 in this example include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 in this example also include exterior emitters. By way of example and not limitation, the exterior emitters in this example include lights to signal a direction of travel or other indicator of vehicle maneuver (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connection(s) 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., computing device(s) 438, other nearby vehicles, etc.).

The communications connection(s) 410 may include physical and/or logical interfaces for connecting the vehicle computing device(s) 404 to another computing device or a network, such as network(s) 440. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include drive system(s) 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, LIDAR sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive system controller which may receive and preprocess data from the sensor system(s) and to control operation of the various vehicle systems. In some examples, the drive system controller may include one or more processors and memory communicatively coupled with the one or more processors. The memory may store one or more systems to perform various functionalities of the drive system(s) 414. Furthermore, the drive system(s) 414 may also include one or more communication connection(s) that enable communication by the respective drive system with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the planning component 424, the reference component 426, the region component 428, the distance component 430, the system controller(s) 432, and/or the map(s) 434 may process sensor data, as described above, and may send their respective outputs, over the one or more network(s) 440, to the computing device(s) 438. In at least one example, the localization component 420, the perception component 422, the planning component 424, the reference component 426, the region component 428, the distance component 430, the system controller(s) 432, and/or the map(s) 434 may send their respective outputs to the computing device(s) 438 at a particular frequency, after a lapse of a predetermined period of time, in near real-time, etc.

In some examples, the vehicle 402 may send sensor data to the computing device(s) 438 via the network(s) 440. In some examples, the vehicle 402 may receive sensor data from the computing device(s) 438 via the network(s) 440. The sensor data may include raw sensor data and/or processed sensor data and/or representations of sensor data. In some examples, the sensor data (raw or processed) may be sent and/or received as one or more log files.

The computing device(s) 438 may include processor(s) 442 and the memory 436. The processor(s) 416 of the vehicle 402 and the processor(s) 442 of the computing device(s) 438 may be any suitable processor capable of executing instructions to process data and perform operations as described herein. By way of example and not limitation, the processor(s) 416 and 442 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and 436 are examples of non-transitory computer-readable media. The memory 418 and 436 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 418 and 436 may include at least a working memory and a storage memory. For example, the working memory may be a high-speed memory of limited capacity (e.g., cache memory) that is used for storing data to be operated on by the processor(s) 416 and 436. In some instances, the memory 418 and 436 may include a storage memory that may be a lower-speed memory of relatively large capacity that is used for long-term storage of data. In some cases, the processor(s) 416 and 436 cannot operate directly on data that is stored in the storage memory, and data may need to be loaded into a working memory for performing operations based on the data, as discussed herein.

It should be noted that while FIG. 4 is illustrated as a distributed system, in alternative examples, components of the vehicle 402 may be associated with the computing device(s) 438 and/or components of the computing device(s) 438 may be associated with the vehicle 402. That is, the vehicle 402 may perform one or more of the functions associated with the computing device(s) 438, and vice versa.

Figure 5:
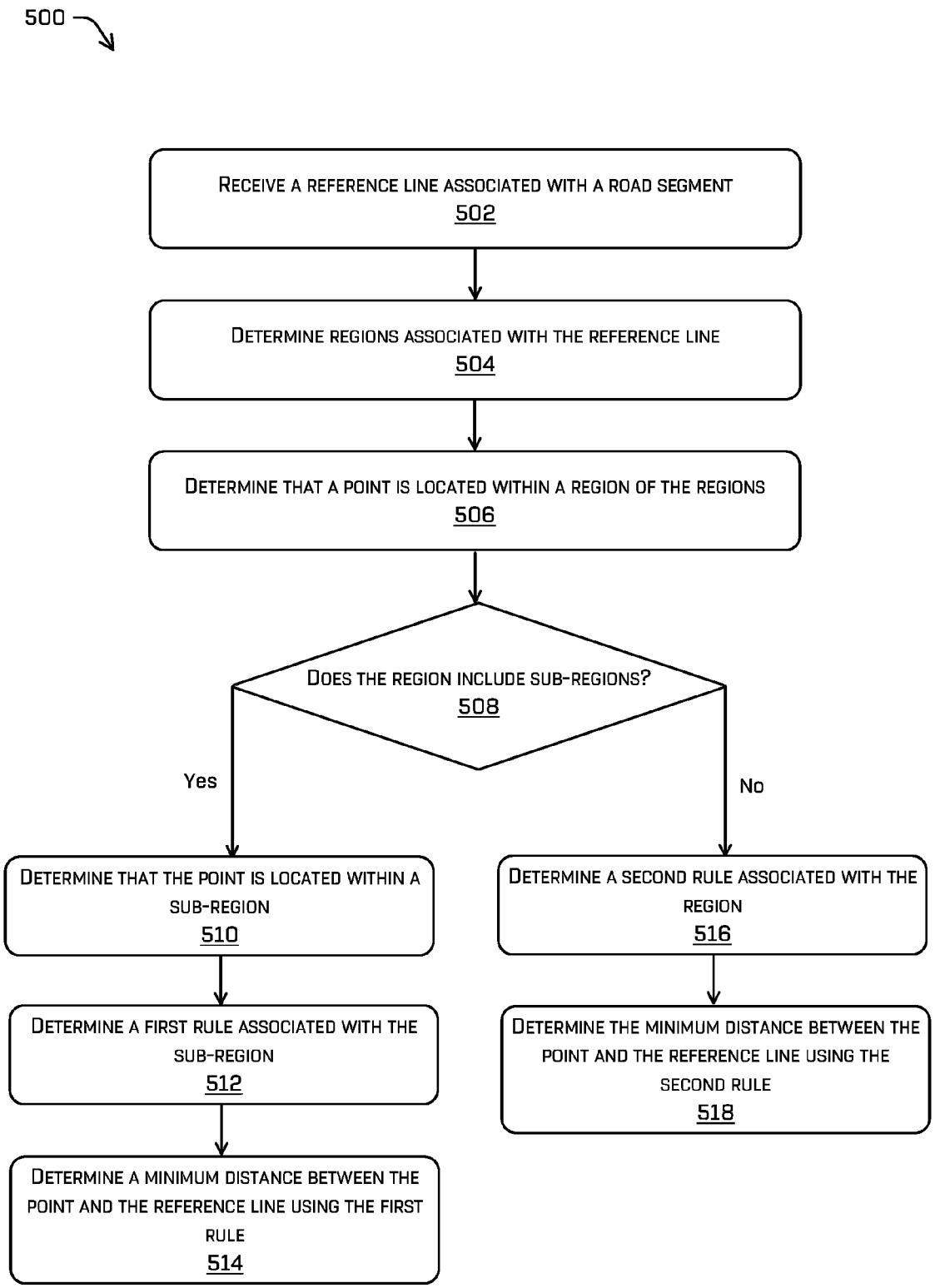
FIG. 5 depicts an example process for determining that a point is located within a region and/or sub-region associated with a reference line and, based on the determination, determining a distance using a rule, in accordance with embodiments of the disclosure.
Figure 6:
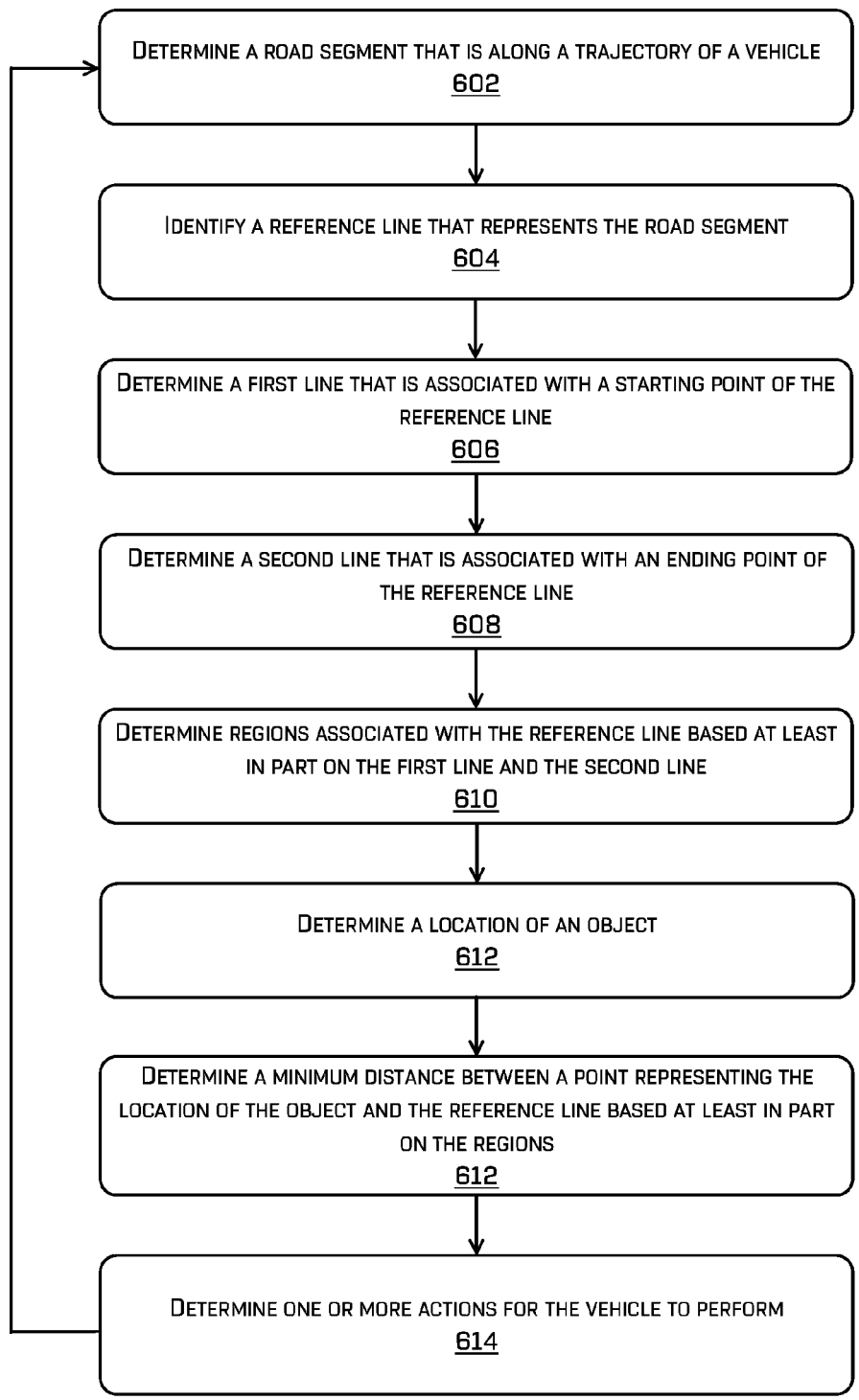
FIG. 6 depicts an example process for determining regions associated with a reference line and then using the regions to determine a distance between a point and the reference line, in accordance with embodiments of the disclosure.

FIGS. 5-6 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes.

FIG. 5 depicts an example process 500 for determining that a point is located within a region and/or sub-region associated with a reference line and, based on the determination, determining a distance using a rule, in accordance with embodiments of the disclosure. At operation 502, the process 500 may include receiving a reference line associated with a road segment. For instance, the vehicle 402 may determine that a reference line is associated with the road segment. In some examples, the vehicle 402 stores data representing reference lines for various road segments for which the vehicle 402 may navigate. In such examples, the vehicle 402 may determine that the vehicle 402 is navigating towards the road segment and retrieve the reference line that is associated with the road segment. In other examples, the vehicle 402 may generate the reference line for the road segment.

At operation 504, the process 500 may include determining regions associated with the reference line. For instance, the vehicle 402 may divide an xy-plane associated with the reference line into portions, such as by using one or more lines. The vehicle 402 may then determine the regions based on the portions. In some examples, the vehicle 402 may determine that there are four regions, where each region is represented by a first line that is normal to a starting point of the reference line and a second line that is normal to an ending point of the reference line. In other examples, the vehicle 402 may determine that there are more or less than four regions that are represented by more or less than two lines.

At operation 506, the process 500 may include determining that a point is located within a region of the regions. For instance, the vehicle 402 may determine that the point, which may represent a location of an object, is located within the region. In some instances, the vehicle 402 makes the determination based on which side(s) of the line(s) the point is located on. For example, the vehicle 402 may determine that the point is located within a first region when the point is to a first side of a first line and a first side of a second line, determine that the point is located within a second region when the point is to the first side of the first line and a second side of the second line, determine that the point is located within a third region when the point is to a second side of the first line and the first side of the second line, and determine that the point is located within a fourth region when the point is to the second side of the first line and the second side of the second line.

At operation 508, the process 500 may include determining whether the region includes sub-regions. For instance, the vehicle 402 may determine if the region includes the sub-regions. In some examples, the vehicle 402 may determine that the region includes sub-regions when there are one or more additional lines (e.g., other than the lines that are normal to the ends of the reference line) within the region. For example, the vehicle 402 may determine that the region includes sub-regions based on the region including a third line that corresponds to a perpendicular bisector of a line segment joining the starting point and the ending point, a fourth line that represents a curved edge that separates reference points that map to the ends of the reference line and points that map to inside of the reference line, and/or a fifth line that extends between the ends of the fourth line.

If, at operation 508, it is determined that the region includes sub-regions, then at operation 510, the process 500 may include determining that the point is located within a sub-region. For instance, if the vehicle 402 determines that the region includes the sub-regions, then the vehicle 402 may determine that the point is also included in the sub-region of the region. In some instances, the vehicle 402 may again make this determination based on which side(s) of the one or more additional line(s) the point is located on. In some instances, the vehicle 402 makes the determination using one or more of the equations described above.

At operation 512, the process 500 may include determining a first rule associated with the sub-region. For instance, the vehicle 402 may determine the first rule based on the sub-region for which the point is located. The first rule may indicate that the point is closest to the starting point, closest to the ending point, closest to one of the starting point or the ending point, closest to a reference point that is between the starting point or the ending point, and/or the like. In some instances, the first rule may be associated with an equation that the vehicle 402 may use to determine the minimum distance between the point and the reference line.

At 514, the process 500 may include determining a minimum distance between the point and the reference line using the first rule. For instance, the vehicle 402 may use the first rule to determine the minimum distance. For a first example, if the first rule indicates that the closest point is the starting point, then the vehicle 402 may determine the minimum distance as the distance between the location of the point and a location of the starting point. For a second example, if the first rule indicates that the closest point is the ending point, then the vehicle 402 may determine the minimum distance as the distance between the location of the point and a location of the ending point.

For a third example, if the first rule indicates that the closest point is the starting point or the ending point, then the vehicle 402 may determine the minimum distance as the smallest distance between the location of the point and the location of the starting point or the location of the point and the location of the ending point. Still, for a fourth example, if the first rule indicates that the closest point is to a reference point between the starting point and the reference point, then the vehicle 402 may determine the minimum distance as the smallest distance between the location of the point and locations of the reference points.

However, if, at operation 508, it is determined that the region does not include sub-regions, then at operation 516, the process 500 may include determining a second rule associated with the region. For instance, the vehicle 402 may determine the second rule based on the region for which the point is located. The second rule may indicate that the point is closest to the starting point, closest to the ending point, closest to one of the starting point or the ending point, closest to a reference point that is between the starting point or the ending point, and/or the like. In some instances, the second rule may be associated with an equation that the vehicle 402 may use to determine the minimum distance between the point and the reference line.

At 518, the process 500 may include determining the minimum distance between the point and the reference line using the second rule. For instance, the vehicle 402 may use the second rule to determine the minimum distance. For a first example, if the second rule indicates that the closest point is the starting point, then the vehicle 402 may determine the minimum distance as the distance between the location of the point and the location of the starting point. For a second example, if the second rule indicates that the closest point is the ending point, then the vehicle 402 may determine the minimum distance as the distance between the location of the point and the location of the ending point.

For a third example, if the second rule indicates that the closest point is the starting point or the ending point, then the vehicle 402 may determine the minimum distance as the smallest distance between the location of the point and the location of the starting point or the location of the point and the location of the ending point. Still, for a fourth example, if the second rule indicates that the closest point is to a reference point between the starting point and the reference point, then the vehicle 402 may determine the minimum distance as the smallest distance between the location of the point and locations of the reference points.

FIG. 6 depicts an example process 600 for determining regions associated with a reference line and then using the regions to determine a distance between a point and the reference line, in accordance with embodiments of the disclosure. At operation 602, the process 600 may include determining a road segment that is along a trajectory of a vehicle and at 604, the process 600 may include identifying a reference line that represents the road segment. For instance, the vehicle 402 may be navigating along a trajectory. While navigating, the vehicle 402 may determine that the vehicle 402 is approaching the road segment and identify the reference line that represents the road segment. In some examples, the vehicle 402 stores data representing the reference line while in other examples, the vehicle 402 generates the reference line.

At operation 606, the process 600 may include determining a first line that is associated with a starting point of the reference line and at operation 608, the process 600 may include determining a second line that is associated with an ending point of the reference line. For instance, the vehicle 402 may determine the first line and the second line. In some examples, the first line is normal to the starting point of the reference line and the second line is normal to the ending point of the reference line. In some examples, the vehicle 402 may determine one or more additional lines. For example, the vehicle 402 may determine a third line that corresponds to a perpendicular bisector of a line segment joining the starting point and the ending point, a fourth line that represents a curved edge that separates reference points that map to the ends of the reference line and points that map to inside of the reference line, and/or a fifth line that extends between the ends of the fourth line.

At operation 610, the process 600 may include determining regions associated with the reference line based at least in part on the first line and the second line. For instance, the vehicle 402 may use at least the first line and the second line to determine the regions, such as within a xy-plane that includes the reference line. In some examples, such as when the vehicle 402 determines one or more additional lines, the vehicle 402 may use the one or more additional lines to determine sub-region(s) for one or more of the regions. In some examples, each region may be associated with at least one rule for determining the minimum distances between points and the reference line.

At operation 612, the process 600 may include determining a location of an object. For instance, the vehicle 402 may generate sensor data using one or more sensors of the vehicle 402. The vehicle 402 may then analyze the sensor data to determine the location of the object within the environment. In some instances, the object is located proximate to the road segment.

At operation 614, the process 600 may include determining a minimum distance between a point representing the location of the object and the reference line based at least in part on the regions. For instance, the vehicle 402 may initially determine that the point is located within a region from the regions. In some examples, the vehicle 402 may further determine that the point is located within a sub-region of the region. The vehicle 402 may then determine a rule associated with the region and/or the sub-region and use the rule to determine the minimum distance.

At operation 614, the process 600 may include determining one or more actions for the vehicle to perform. For instance, the vehicle 402 may determine the one or more actions based on the minimum distance. The one or more actions may include, but are not limited to, continuing along the trajectory, determining a new trajectory, determining to change a velocity, determining to stop, and/or the like.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A: An autonomous vehicle comprising: one or more sensors; one or more processors; and one or more computer-readable media storing instructions that, when executed by the one or more processors, cause the one or more processors to perform operations comprising: receiving a reference line segment associated with a road segment located within an environment, the reference line segment defined by a segment of a spiral; determining a first line that is perpendicular to the reference line segment at a starting point of the reference line segment; determining a second line that is perpendicular to the reference line segment at an ending point of the reference line segment; determining a set of regions associated with the reference line segment based at least in part on the first line and the second line; receiving sensor data from the one or more sensors; determining, based at least in part on the sensor data, a location of an object within the environment; determining that the location of the object corresponds to a region from the regions; determining, based at least in part on the location of the object corresponding to the region, a minimum distance between the location of the object and the reference line segment; and causing the autonomous vehicle to perform an action based at least in part on the minimum distance.

B: The autonomous vehicle as recited paragraph A, wherein determining the minimum distance between the location of the object and the reference line segment comprises at least: determining that the region is associated with the starting point of the reference line segment; and determining the minimum distance as a distance between the location of the object and the starting point of the reference line segment.

C: The autonomous vehicle as recited in either paragraph A or paragraph B, wherein determining the minimum distance between the location of the object and the reference line segment comprises at least: determining, based at least in part on the region, a first distance between the location of the object and the starting point of the reference line segment; determining, based at least in part on the region, a second distance between the location of the object and the ending point of the reference line segment; and determining the minimum distance as a shortest distance between the first distance and the second distance.

D: The autonomous vehicle as recited in any one of paragraphs A-C, wherein determining the minimum distance between the location of the object and the reference line segment comprises at least determining, using an optimization function, the minimum distance between the location of the object and the reference line segment.

E: The autonomous vehicle as recited in any one of paragraphs A-D, the operations further comprise: determining at least a third line corresponding to a Voronoi edge associated with the reference line segment, and wherein determining the minimum distance between the location of the object and the reference line segment comprises at least: determining that the location of the object corresponds to a sub-region of the region, the sub-region being associated with a portion of the region that is located proximate the third line; determining a rule that is associated with the sub-region; and determining the minimum distance based at least in part the location of the object and the rule.

F: A method comprising: receiving a reference line segment associated with a road segment; determining, based at least in part on the reference line segment, a set of regions; determining that a location corresponds to a region from the set of regions; determining, based at least in part on the region, a minimum distance between the location and the reference line segment; and determining, based at least in part on the minimum distance, at least an action for the vehicle.

G: The method as recited in paragraph F, wherein determining the minimum distance between the location and the reference line segment comprises at least: determining that the region is associated with an endpoint of the reference line segment; and determining the minimum distance as a distance between the location and the endpoint of the reference line segment.

H: The method as recited in either paragraph F or paragraph G, wherein determining the minimum distance between the location and the reference line segment comprises at least: determining, based at least in part on the region, a first distance between the location and a first endpoint of the reference line segment; determining, based at least in part on the region, a second distance between the location and a second endpoint of the reference line segment; and determining the minimum distance as a shortest distance between the first distance and the second distance.

I: The method as recited in any one of paragraphs F-H, wherein determining the minimum distance between the location and the reference line segment comprises at least determining, using an optimization function, the minimum distance between the location and the reference line segment.

J: The method as recited in any one of paragraphs F-I, wherein determining the minimum distance between the location and the reference line segment comprises at least: determining that the location corresponds to a sub-region of the region; and determining, based at least in part on the sub-region, the minimum distance between the location and the reference line segment.

K: The method as recited in paragraph J, wherein determining minimum distance between the location and the reference line segment comprises at least: determining a rule associated with the sub-region, the rule indicating at least one of: the minimum distance is associated with a first endpoint of the reference line segment; the minimum distance is associated with a second endpoint segment; the minimum distance is associated with at least one of the first endpoint or the second endpoint, or the minimum distance is determined using an optimization function; and determining the minimum distance using at least the rule.

L: The method as recited in paragraph J, further comprising: determining a first line that is normal to a first endpoint of the reference line segment; determining a second line that is normal to a second endpoint of the reference line segment; and determining a third line that connects to at least a first point on the first line and a second point on the second line, wherein determining that the location associated with the object corresponds to the sub-region of the region comprises determining a position of the location relative to the third line.

M: The method as recited in paragraph J, further comprising: determining an evolute associated with the reference line segment, wherein determining that the location associated with the object corresponds to the sub-region of the region comprises determining a position of the location relative to the evolute.

N: The method as recited in any one of paragraphs F-M, wherein determining the regions associated with the road segment comprises at least: determining a first line that is normal to a first endpoint of the reference line segment; determining a second line that is normal to a second ending point of the reference line segment; determining a first region that is associated with a first portion of the first line and a first portion of the second line; determining a second region that is associated with the first portion of the first line and a second portion of the second line; determining a third region that is associated with a second portion of the first line and the first portion of the second line; and determining a fourth region that is associated with the second portion of the first line and the second portion of the second line.

O: The method as recited in any one of paragraphs F-N, wherein determining the action for the vehicle to perform comprises at least: determining, based at least in part on the minimum distance, a cost associated with a trajectory of the vehicle; and determining the action based at least in part on the cost.

P: One or more non-transitory computer-readable media storing instructions that, when executed by one or more processors, cause the one or more processors to perform operations comprising: receiving a reference line segment associated with a road segment of an environment; determining a set of regions based at least in part on the reference line segment; determining that a location within the environment is associated with a region from the set of regions; and determining, based at least in part on the region, a minimum distance between the location and the reference line segment.

Q: The one or more non-transitory computer-readable media as recited in paragraph P, wherein determining the minimum distance between the location and the reference line segment comprises at least: determining that the region is associated with the first endpoint of the reference line segment; and determining the minimum distance as a distance between the location and the first endpoint of the reference line segment.

R: The one or more non-transitory computer-readable media as recited in either paragraph P or paragraph Q, wherein determining the minimum distance between the location and the reference line segment comprises at least: determining, based at least in part on the region, a first distance between the location and the first endpoint of the reference line segment; determining, based at least in part on the region, a second distance between the location and the second endpoint of the reference line segment; and determining the minimum distance as a shortest distance between the first distance and the second distance.

S: The one or more non-transitory computer-readable media as recited in any one of paragraphs P-R, wherein determining the minimum distance between the location and the reference line segment comprises at least determining, using an optimization function, the minimum distance between the location and the reference line segment.

T: The one or more non-transitory computer-readable media as recited in any one of paragraphs P-S, wherein determining the minimum distance between the location and the reference line segment comprises at least: determining that the location corresponds to a sub-region of the region; and determining, based at least in part on the sub-region of the region, the minimum distance between the location and the reference line segment.

The invention claimed is:

1. An autonomous vehicle comprising:
one or more sensors;
one or more processors; and
one or more computer-readable media storing instructions that, when executed by the one or more processors, cause the one or more processors to perform operations comprising:
receiving a reference line segment associated with a road segment located within an environment, the reference line segment defined by a segment of a spiral;
determining a first line that is perpendicular to the reference line segment at a starting point of the reference line segment;
determining a second line that is perpendicular to the reference line segment at an ending point of the reference line segment;
determining a set of regions associated with the reference line segment based at least in part on the first line and the second line;
receiving sensor data from the one or more sensors;
determining, based at least in part on the sensor data, a location of an object within the environment;
determining that the location of the object corresponds to a region from the regions;
determining, based at least in part on the location of the object corresponding to the region, a minimum distance between the location of the object and the reference line segment; and
causing the autonomous vehicle to perform an action based at least in part on the minimum distance.

2. The autonomous vehicle as recited in claim 1, wherein determining the minimum distance between the location of the object and the reference line segment comprises at least:
determining that the region is associated with the starting point of the reference line segment; and
determining the minimum distance as a distance between the location of the object and the starting point of the reference line segment.

3. The autonomous vehicle as recited in claim 1, wherein determining the minimum distance between the location of the object and the reference line segment comprises at least:
determining, based at least in part on the region, a first distance between the location of the object and the starting point of the reference line segment;
determining, based at least in part on the region, a second distance between the location of the object and the ending point of the reference line segment; and
determining the minimum distance as a shortest distance between the first distance and the second distance.

4. The autonomous vehicle as recited in claim 1, wherein determining the minimum distance between the location of the object and the reference line segment comprises at least determining, using an optimization function, the minimum distance between the location of the object and the reference line segment.

5. The autonomous vehicle as recited in claim 1, the operations further comprise:
determining at least a third line corresponding to a Voronoi edge associated with the reference line segment,
and wherein determining the minimum distance between the location of the object and the reference line segment comprises at least:
determining that the location of the object corresponds to a sub-region of the region, the sub-region being associated with a portion of the region that is located proximate the third line;

determining a rule that is associated with the sub-region; and determining the minimum distance based at least in part the location of the object and the rule.

6. A method comprising:

receiving a reference line segment associated with a road segment;

determining a first line normal to the reference line segment at a first point along the reference line segment;

determining a second line that is normal to the reference line segment at a second point along the reference line segment;

determining, based at least in part on the first line and the second line, a set of regions associated with the reference line segment;

determining that a location corresponds to a region from the set of regions;

determining, based at least in part on the region, a minimum distance between the location and the reference line segment;

determining, based at least in part on the minimum distance, at least an action for a vehicle; and causing the vehicle to perform an action based at least in part on the minimum distance.

7. The method as recited in claim 6, wherein determining the minimum distance between the location and the reference line segment comprises at least:

determining that the region is associated with an endpoint of the reference line segment; and determining the minimum distance as a distance between the location and the endpoint of the reference line segment.

8. The method as recited in claim 6, wherein determining the minimum distance between the location and the reference line segment comprises at least:

determining, based at least in part on the region, a first distance between the location and a first endpoint of the reference line segment;

determining, based at least in part on the region, a second distance between the location and a second endpoint of the reference line segment; and determining the minimum distance as a shortest distance between the first distance and the second distance.

9. The method as recited in claim 6, wherein determining the minimum distance between the location and the reference line segment comprises at least determining, using an optimization function, the minimum distance between the location and the reference line segment.

10. The method as recited in claim 6, wherein determining the minimum distance between the location and the reference line segment comprises at least:

determining that the location corresponds to a sub-region of the region; and determining, based at least in part on the sub-region, the minimum distance between the location and the reference line segment.

11. The method as recited in claim 10, wherein determining the minimum distance between the location and the reference line segment comprises at least:

determining a rule associated with the sub-region, the rule indicating at least one of:
 the minimum distance is associated with a first endpoint of the reference line segment;
 the minimum distance is associated with a second endpoint segment;
 the minimum distance is associated with at least one of the first endpoint or the second endpoint, or
 the minimum distance is determined using an optimization function; and determining the minimum distance using at least the rule.

12. The method as recited in claim 10, further comprising:

determining that the first line is normal to a first endpoint of the reference line segment;

determining that the second line is normal to a second endpoint of the reference line segment; and determining a third line that connects to at least the first point on the first line and the second point on the second line, wherein determining that the location corresponds to the sub-region of the region comprises determining a position of the location relative to the third line.

13. The method as recited in claim 10, further comprising:

determining an evolute associated with the reference line segment, wherein determining that the location corresponds to the sub-region of the region comprises determining a position of the location relative to the evolute.

14. The method as recited in claim 6, wherein determining the regions associated with the road segment comprises at least:

determining that the first line is normal to a first endpoint of the reference line segment;

determining that the second line is normal to a second ending point of the reference line segment;

determining a first region that is associated with a first portion of the first line and a first portion of the second line;

determining a second region that is associated with the first portion of the first line and a second portion of the second line;

determining a third region that is associated with a second portion of the first line and the first portion of the second line; and determining a fourth region that is associated with the second portion of the first line and the second portion of the second line.

15. The method as recited in claim 6, wherein determining the action for the vehicle to perform comprises at least:

determining, based at least in part on the minimum distance, a cost associated with a trajectory of the vehicle; and determining the action based at least in part on the cost.

16. One or more non-transitory computer-readable media storing instructions that, when executed by one or more processors, cause the one or more processors to perform operations comprising:

receiving a reference line segment associated with a road segment of an environment;

determining a first line normal to the reference line segment at a first point along the reference line segment;

determining a second line normal to the reference line segment at a second point along the reference line segment;

determining a set of regions associated with the reference line based at least in part on the first line and the second line ;

determining that a location within the environment is associated with a region from the set of regions;

determining, based at least in part on the region, a minimum distance between the location and the reference line segment; and causing a vehicle to perform an action based at least in part on the minimum distance.

17. The one or more non-transitory computer-readable media as recited in claim 16, wherein determining the minimum distance between the location and the reference line segment comprises at least:

determining that the region is associated with a first endpoint of the reference line segment; and determining the minimum distance as a distance between the location and the first endpoint of the reference line segment.

18. The one or more non-transitory computer-readable media as recited in claim 16, wherein determining the minimum distance between the location and the reference line segment comprises at least:

determining, based at least in part on the region, a first distance between the location and a first endpoint of the reference line segment;

determining, based at least in part on the region, a second distance between the location and a second endpoint of the reference line segment; and determining the minimum distance as a shortest distance between the first distance and the second distance.

19. The one or more non-transitory computer-readable media as recited in claim 16, wherein determining the minimum distance between the location and the reference line segment comprises at least determining, using an optimization function, the minimum distance between the location and the reference line segment.

20. The one or more non-transitory computer-readable media as recited in claim 16, wherein determining the minimum distance between the location and the reference line segment comprises at least:

determining that the location corresponds to a sub-region of the region; and determining, based at least in part on the sub-region of the region, the minimum distance between the location and the reference line segment.

\* \* \* \* \*